June 20, 1961  H. SCHAEFER  2,989,376
METHOD OF PRODUCING PURE SILICON
Filed March 12, 1954
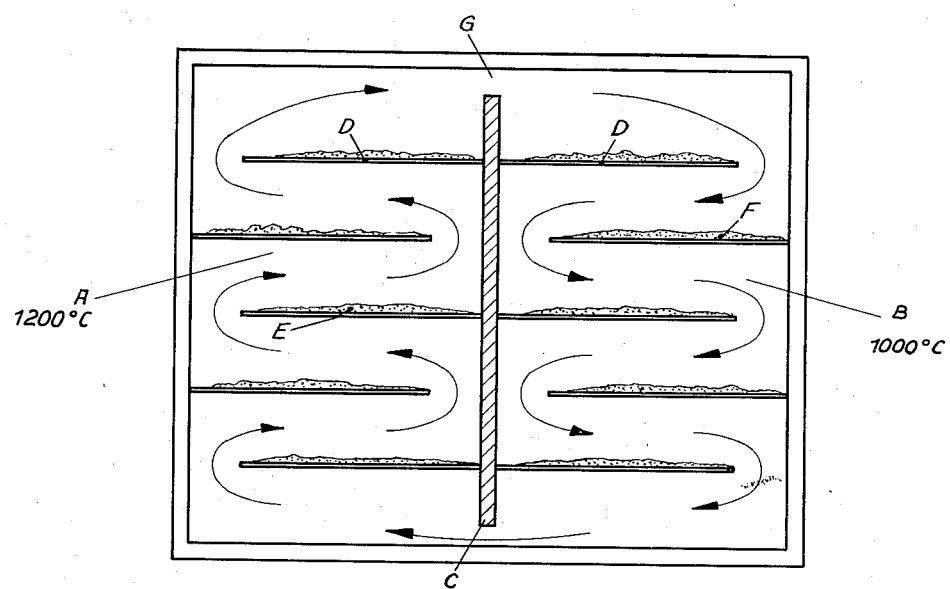

2,989,376
METHOD OF PRODUCING PURE SILICON
Harald Schaefer, Munster, Westphalia, Germany, assignor to W. C. Heraeus G.m.b.H., Hanau (Main), Germany, a German body corporate
Filed Mar. 12, 1954, Ser. No. 415,933
Claims priority, application Germany Mar. 19, 1953
11 Claims. (Cl. 23—223.5)

The present invention provides a new and improved method for the production of pure silicon. The invention is distinguished on the one hand by simplicity and on the other hand by the fact that in spite of its simplicity it will produce a silicon of particularly high purity. In addition the method offers to the art a great many of possibilities of variations as will be appreciated from the following description. We have discovered that it is possible to produce pure silicon by causing silicon tetrahalides to act upon silicon at an elevated temperature. It has been found that hereby lower silicon halides are formed, and if these are further moved, for example by diffusion or by means of a carrier gas, to a point having a lower temperature than the point at which the silicon halides are formed, then they will again disproportionate (be decomposed) under reformation of silicon. It has been found that the silicon thus formed is distinguished by particularly great purity.

In the example of silicon chloride it can be demonstrated that we are concerned with a transparent reaction; thermo-chemical investigations have shown that the transformation of silicon with silicon tetrachloride is unambiguously described by the following reaction:

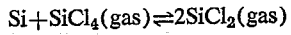

$$Si + SiCl_4(gas) \rightleftharpoons 2SiCl_2(gas)$$

The reaction first occurs according to this equation from the left to the right. At a lower temperature according to the indicated equation the inverse reaction takes place i.e. disproportionation (decomposition) of silicon dichloride into silicon and silicon tetrachloride.

Although the production of pure silicon is possible by the described method with the use of silicon tetrafluoride, on the other hand silicon tetrachloride, silicon tetrabromide and silicon tetraiodide have proved to be particularly advantageous amongst the silicon halides. More particularly it has been found in the case of silicon tetraiodide that the process will be performed when the latter is used at about four times the speed as compared with the use of silicon tetrachloride and silicon tetrabromide.

A temperature of at least 700° C. is required for the conversion of silicon with silicon halides; the conversion process, however, better with higher temperatures, to become already appreciable at 1000° C. Accordingly temperatures of 1100 to 1350° C. are generally preferred, and very good results are obtained at temperatures between 1150° and 1300° C. If it is desired to perform the conversion with solid silicon, one is restricted by the melting point of silicon at 1414° C. In principle, however, the reaction may also be performed with melted silicon i.e. at temperatures above 1414° C. for example under special conditions up to 2000° C.

The pressures for the silicon halides lie between 1 mm. Hg and 20 kg./sq. cm. These limits are determined by the requirements of practical operation inasmuch as at lower pressures the rate of transport is too low while at higher pressures the difficulties as regards apparatus increase greatly; as far as purely thermo-dynamic considerations are concerned it would also be possible to work beyond these limits. In practice it is of advantage to employ readily handled pressures of 100 mm. Hg up to 1 kg./sq. cm., and the working pressure may for example be 0.5 kg./sq. cm.

The lower silicon halide produced, i.e. in the case of a chloride, silicon dichloride, is now conveyed by diffusion or by means of a carrier gas, for which rare (noble) gases or hydrogen are suitable, to a place of lower temperature. The inverse reaction, in which under decomposition silicon is freed, commences at once when the temperature falls below the above indicated temperature at which silicon is volatilised by the action of the silicon tetrahalide. In practice the temperature will generally be chosen at least 100° C. lower than the temperature at the first-mentioned point, and very good results are already obtained with, for example, a temperature of 200° C. If desired a condensation zone extending over several hundreds of degrees for example of up to 500° C. temperature difference may be created.

It is of great importance for the practical execution of the reaction that some technically readily available materials can be found for the construction of the reaction chamber which will not give any undesirable side reactions at the required high temperatures. Most of the construction materials that are readily available are attacked by silicon tetrachloride, gaseous chlorides e.g. aluminium chloride, ferrous chloride, and ferric chloride being formed which lead to contamination of the silicon. In contrast to this quartz has surprisingly been found suitable as construction material although it is known that silicon dioxide will react with elemental silicon to form silicon monoxide, and although quartz will in the presence of silicon and silicon monoxide become recrystallised with extraordinary rapidity at temperatures above 1000° C. We have, however, now discovered the unexpected phenomenon that the recrystallisation of quartz and also the formation of silicon monoxide is largely suppressed if the gaseous phase contains a sufficient quantity of silicon tetrachloride. It has been found that recrystallisation of the quartz glass will be suppressed already at a silicon tetrachloride pressure of at least a few millimetres, and that silicon in the presence of silicon tetrachloride having a partial pressure of 0.5 kg./sq. cm. or more can be heated up to the softening point of quartz without recrystallisation occurring. Due to this fact the exploitation of the reaction for the production of pure silicon becomes practicable in a reaction chamber made of readily available construction material. Other silicon-containing materials, for example silicon carbide, are also suitable, and if desired also graphite walls, which in the course of the reaction themselves become superficially silicised i.e. converted into silicon carbide.

According to the invention the process for the production of pure silicon is started from a silicon preparation obtained by any desired method and still containing impurities. If desired or necessary a preliminary purification is first effected, for example by treating the technical (industrial) product, for example 90% Fe—Si, with hydrochloric and hydrofluoric acid or by effecting recrystallisation from metal melts, e.g. from silver.

We have also discovered the further surprising fact that in the method of the invention preliminary purification via silicon monoxide is particularly effective. Technical (industrial) silicon is converted in a high vacuum at temperatures above 1000° C. with silicon dioxide into silicon monoxide gas, the silicon monoxide condensate being then subjected to the silicon tetrahalide reaction in the same manner as described above with reference to silicon itself. The silicon monoxide is primarily decomposed into silicon and silicon dioxide, oxidic impurities being passed into the silicon dioxide phase. In a second step the silicon is brought to reaction with silicon tetrachloride and passes into the vapour phase.

It is not necessary for the silicon tetrahalides to be introduced into the reaction chamber in ready prepared form, but on the contrary it is sufficient for the same to be caused to be produced within the reaction chamber itself from silicon and the halogen, temperatures above 300° C. being sufficient for this purpose even at a very low halogen pressure. In general, however, the formation of the silicon tetrahalides will not be arranged to be effected at this low temperature but for simplicity's sake already at the temperature at which it is intended for the tetrahalide to act upon the elemental silicon for the formation of the lower silicon halide.

Although the silicon tetrachloride pressure may lie, for example, between 0.01 and 10 kg./sq. cm., the method of the invention offers particular advantages when working with vapour of atmospheric pressure. The vapour which may for example, be supplied from a boiling flask containing silicon tetrachloride, passes in a quartz tube at about 1250° C. over the originally provided silicon to form there silicon dichloride, which will become decomposed at about 1000° under reformation of silicon. Pure silicon is obtained in this manner in the form of large needle-shaped crystals.

As already emphasised above, the process is performed more rapidly when using silicon tetraiodide than it is when using silicon tetrachloride or silicon tetrabromide. The use of the iodide also offers the further advantage that the required quantities of iodine can be conveniently introduced into the reaction chamber. In the case of silicon tetraiodide an appreciable transport of silicon will already be observed at a partial pressure of 65 mm. and a temperature drop from 1150° C. to 950° C., due to its proper (specific) diffusion, silicon being deposited in pure form at the point of the lower temperature. It is emphasised that the method according to the invention is different from a known method in which the metals are transported as iodides of lower temperature to an incandescent wire at which they become decomposed. In the method of the invention the silicon is transported via the iodide from a point of higher temperature to a point of lower temperature and is obtained in this manner with a high degree of purity.

But not only when producing pure silicon with the help of silicon tetrachloride and silicon tetrabromide but also when producing it with the help of silicon tetraiodide, a carrier gas will be used, particularly in the case when low halide pressures are employed, in order to supplement the total pressure with the help of the carrier gas to atmospheric pressure.

The method of the invention may be performed readily in such manner that the silicon tetrahalide vapour is moved in circulation, this applying also when a carrier gas is employed.

The accompanying drawing is a schematic diagram which, however, is not intended to restrict the scope of the invention in any manner.

In a reaction chamber A having walls of silicon dioxide "hurdles" (trays) D are arranged on which is placed elemental silicon E in an impure or only preliminarily purified condition. In this chamber, which is heated to a temperature of 1200° C., a silicon tetrahalide, for example silicon tetrachloride, flowing in the direction of the arrows acts upon the elemental silicon. The silicon dichloride produced will escape into the reaction chamber B, which is heated to about 1000° C., and which is separated by an insulating partition C from the chamber A. The silicon produced by disproportionating (decomposition) at the lower temperature deposits itself at F on hurdles arranged in the chamber B. The reformed silicon tetrachloride is fed back to the chamber A. In this operation hydrogen or argon is preferably employed in the above described manner as a carrier gas which, together with the silicon tetrahalide which is present for example at a pressure of 0.5 kg./sq. cm., supplements the pressure to atmospheric pressure. In order to speed up the circulation of the gases and to avoid limitation to the speed of diffusion, a circulating device G, which may for example be a ventilator having blades of silicon dioxide, is preferably provided where indicated by the reference G in order to ensure that the gases move through the chambers A and B in the direction of the arrows.

I claim:

1. The method of producing pure silicon comprising as a first stage the contacting of a silicon tetrahalide and a first phase silicon at a temperature between 700° C. and 2000° C. and a pressure between 1 mm. Hg. and about 15,000 mm. Hg., passing the reaction product of said silicon tetrahalide and said silicon into a second stage under a temperature below the first stage temperature, wherein the reaction product is reformed into a silicon tetrahalide and a second phase silicon, said second phase silicon being of higher purity than said first phase silicon.

2. The method according to claim 1, comprising contacting said first phase silicon with a halogen at a temperature above 300° C. prior to said first stage.

3. The method acording to claim 1, comprising passing said reformed silicon tetrahalide into said first stage.

4. The method of producing pure silicon comprising contacting a silicon tetrahalide and a first phase silicon at a temperature between 700° C. and 2000° C. and a pressure between 1 mm. Hg and about 15,000 mm. Hg in a first chamber, passing the reaction product of said silicon tetrahalide and said silicon into a second chamber at a temperature below said first chamber temperature, wherein the reaction product is reformed into a silicon tetrahalide and a second phase silicon, said second phase silicon being of higher purity than said first phase silicon.

5. The method according to claim 4, comprising circulating said silicon tetrahalide and a carrier gas therefor between said first and second chambers, said carrier gas being selected from the group consisting of the noble gases and hydrogen.

6. The method according to claim 4, wherein said silicon tetrahalide consists of at least one of silicon tetrachloride, silicon tetrabromide, and silicon tetraiodide.

7. The method according to claim 6, wherein said first chamber temperature is between 1000° C. and 1414° C. and said first chamber pressure is between about 7 mm. Hg and about 7500 mm. Hg.

8. The method according to claim 4, wherein said reaction and reformation is conducted in said chambers whose inner walls have a surface composed of a material selected from the group consisting of silicon dioxide, silicon carbide and graphite.

9. The method of producing pure silicon, comprising as a first stage the contacting a silicon tetrahalide and a first phase silicon at a temperature between 1100° C. and 1350° C. and a pressure between 100 mm. Hg and 1500 mm. Hg, said silicon tetrahalide being selected from the group consisting of silicon tetrachloride, silicon tetrabromide, and silicon tetraiodide, passing the reaction product of said first phase silicon and silicon tetrahalide, which comprises a lower silicon halide, into a second stage at a temperature of at least 100° C. lower than said first stage temperature, wherein the reaction product is reformed into a silicon tetrahalide and a second phase silicon, said second phase silicon being of higher purity than said first phase silicon.

10. The method of producing pure silicon comprising combining under vacuum impure silicon and silicon dioxide at a temperature above 1000° C. with the attendant formation of silicon monoxide, reacting said silicon monoxide with a silicon tetrahalide at a temperature between 1000° C. and 1414° C. and a pressure between about 7 mm. Hg and about 7500 mm. Hg, passing the reaction product of said silicon monoxide and said silicon tetrahalide into a temperature zone of lower temperature than the said reaction temperature, wherein the reaction product is reformed into said silicon tetrahalide and silicon of higher purity than said impure silicon.

11. The method according to claim 9, wherein said silicon tetraiodide contacts said first phase silicon at a pressure of at least 65 mm. Hg.

References Cited in the file of this patent

UNITED STATES PATENTS

| | | |
|---|---|---|
| 1,241,796 | Weaver | Oct. 2, 1917 |
| 2,470,305 | Gross | May 17, 1949 |
| 2,607,675 | Gross | Aug. 19, 1952 |
| 175,021 | Switzerland | May 1, 1935 |

FOREIGN PATENTS

| | | |
|---|---|---|
| 175,021 | Switzerland | May 1, 1935 |

OTHER REFERENCES

Parravano et al.: Chem. Abstracts, vol. 17, page 3651[5], 1923.